US010273872B2

(12) United States Patent
Quelhas et al.

(10) Patent No.: US 10,273,872 B2
(45) Date of Patent: Apr. 30, 2019

(54) AIR-TO-AIR CHARGE AIR COOLER (A-CAC) FOR A VEHICLE

(71) Applicant: GM GLOBAL TECHNOLOGY OPERATIONS LLC, Detroit, MI (US)

(72) Inventors: Sergio Quelhas, Ann Arbor, MI (US); John W. Myers, Howell, MI (US); Werner Filsinger, Wiesbaden (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 56 days.

(21) Appl. No.: 15/350,595

(22) Filed: Nov. 14, 2016

(65) Prior Publication Data

US 2018/0135508 A1 May 17, 2018

(51) Int. Cl.
*F02B 29/04* (2006.01)
*F02M 31/04* (2006.01)
*F02M 31/07* (2006.01)
*F02M 31/20* (2006.01)

(52) U.S. Cl.
CPC ....... *F02B 29/0425* (2013.01); *F02M 31/042* (2013.01); *F02M 31/07* (2013.01); *F02M 31/205* (2013.01); *Y02T 10/126* (2013.01); *Y02T 10/146* (2013.01)

(58) Field of Classification Search
CPC .............. F02B 29/0493; F02B 29/0425; F02B 29/0481; F02M 31/02; F02M 31/07; F02M 31/205
USPC ................................ 60/280, 281, 605.1, 599
See application file for complete search history.

(56) References Cited

U.S. PATENT DOCUMENTS

2008/0295811 A1* 12/2008 Holler ................ F02B 29/0412 123/542

FOREIGN PATENT DOCUMENTS

DE 102009036740 A1 * 2/2011 .......... F02B 29/0456

* cited by examiner

*Primary Examiner* — Mark A Laurenzi
*Assistant Examiner* — Mickey H France
(74) *Attorney, Agent, or Firm* — Cantor Colburn LLP

(57) ABSTRACT

A charge air cooler (CAC) includes a first header including a first interior portion, a second header spaced from the first header. The second header includes a second interior portion. At least one conduit extends between the first header and the second header. The at least one conduit includes a first end fluidically connected to the first interior portion, a second end fluidically connected to the second interior portion, and an intermediate portion extending therebetween. A heating system is arranged in a heat exchange relationship with the at least one conduit. The heating system is selectively operable to increase a temperature of fluids passing through the at least one conduit into one of the first and second headers.

18 Claims, 10 Drawing Sheets

AIR-TO-AIR CHARGE AIR COOLER (A-CAC) FOR A VEHICLE

FIELD OF THE INVENTION

The subject invention relates to the art of charge air coolers for vehicles and, more particularly to an air-to-air charge air cooler for a vehicle.

BACKGROUND

A charge air cooler (CAC) is a device used to cool air passing from a turbocharger before entering an engine. Reducing temperatures of the air passing from the turbocharger prior to introduction into a cylinder increases combustion power. An air-to-air CAC employs a heat exchanger in which air exiting from the turbocharger is passed in a heat exchange relationship with ambient air. When ambient temperatures are low, moisture in the air passing through the CAC from the turbocharger may freeze creating blockages that reduce the efficacy of the CAC. Accordingly, it is desirable to provide a system for reducing blockages in the CAC caused by moisture being exposed to low ambient air temperatures.

SUMMARY OF THE INVENTION

In accordance with an exemplary embodiment, a charge air cooler (CAC) includes a first header including a first interior portion, a second header spaced from the first header. The second header includes a second interior portion. At least one conduit extends between the first header and the second header. The at least one conduit includes a first end fluidically connected to the first interior portion, a second end fluidically connected to the second interior portion, and an intermediate portion extending therebetween. A heating system is arranged in a heat exchange relationship with the at least one conduit. The heating system is selectively operable to increase a temperature of fluids passing through the at least one conduit into one of the first and second headers.

In accordance with another aspect of an exemplary embodiment, a vehicle includes body, and a powertrain mechanically linked to the body. The powertrain includes an internal combustion engine having an intake manifold including an inlet and an exhaust manifold fluidically connected to an exhaust outlet. A turbocharger includes a turbine portion and a compressor portion. The turbine portion receives a portion of exhaust gases passing from the exhaust manifold. A charge air cooler (CAC) is fluidically connected between the compressor portion and the intake manifold. The CAC includes a first header including a first interior portion, a second header spaced from the first header. The second header includes a second interior portion. At least one conduit extends between the first header and the second header. The at least one conduit includes a first end fluidically connected to the first interior portion, a second end fluidically connected to the second interior portion, and an intermediate portion extending therebetween. A heating system is arranged in a heat exchange relationship with the at least one conduit. The heating system is selectively operable to increase a temperature of fluids passing through the at least one conduit into one of the first and second headers.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
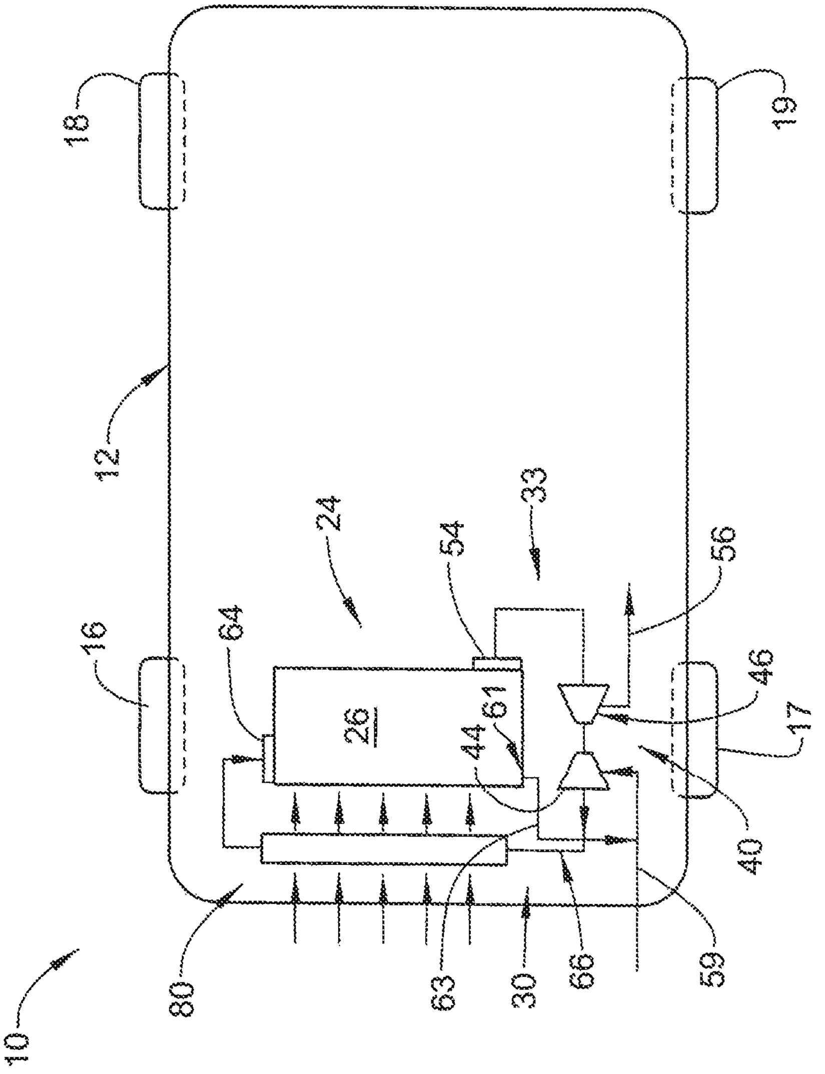
FIG. 1 is a partially cut away schematic representation of a vehicle including an air-to-air charge air cooler (A-CAC), in accordance with an exemplary embodiment.

The following description is merely exemplary in nature and is not intended to limit the present disclosure, its application or uses. It should be understood that throughout the drawings, corresponding reference numerals indicate like or corresponding parts and features.

A vehicle, in accordance with an exemplary embodiment, is indicated generally at 10 in FIG. 1. Vehicle 10 includes a body 12 supported by a chassis (not shown) and a plurality of wheels 16-19. Vehicle 10 also includes a powertrain 24 including, at least in part, an internal combustion engine 26, an intake system 30, an exhaust system 33 and a turbocharger 40. Turbocharger 40 includes a compressor portion 44 fluidically connected with intake system 30 and a turbine portion 46 fluidically connected with exhaust system 33. An exhaust manifold 54 is supported by engine 26. Exhaust manifold 54 is fluidically connected to an exhaust gas conduit 56 through turbine portion 46. Exhaust gas conduit 56 discharges exhaust gases to ambient. Exhaust gas conduit 56 may include one or more after treatment devices (not shown) that reduce exhaust noise and/or remove various constituents from the exhaust gases.

An ambient air inlet 59 is fluidically connected with compressor portion 44. A secondary inlet 61 may also deliver crankcase ventilation gases to compressor portion 44 through a crankcase ventilation conduit 63. Charged gases, created in compressor portion 44, pass through a charged gas outlet 66 to an intake manifold 64. An air-to-air charged air cooler (CAC) 80 is coupled between compressor portion 44 and intake manifold 64. CAC 80 reduces a temperature of the charged gasses passing into intake manifold 64 to improve combustion.

Figure 2:
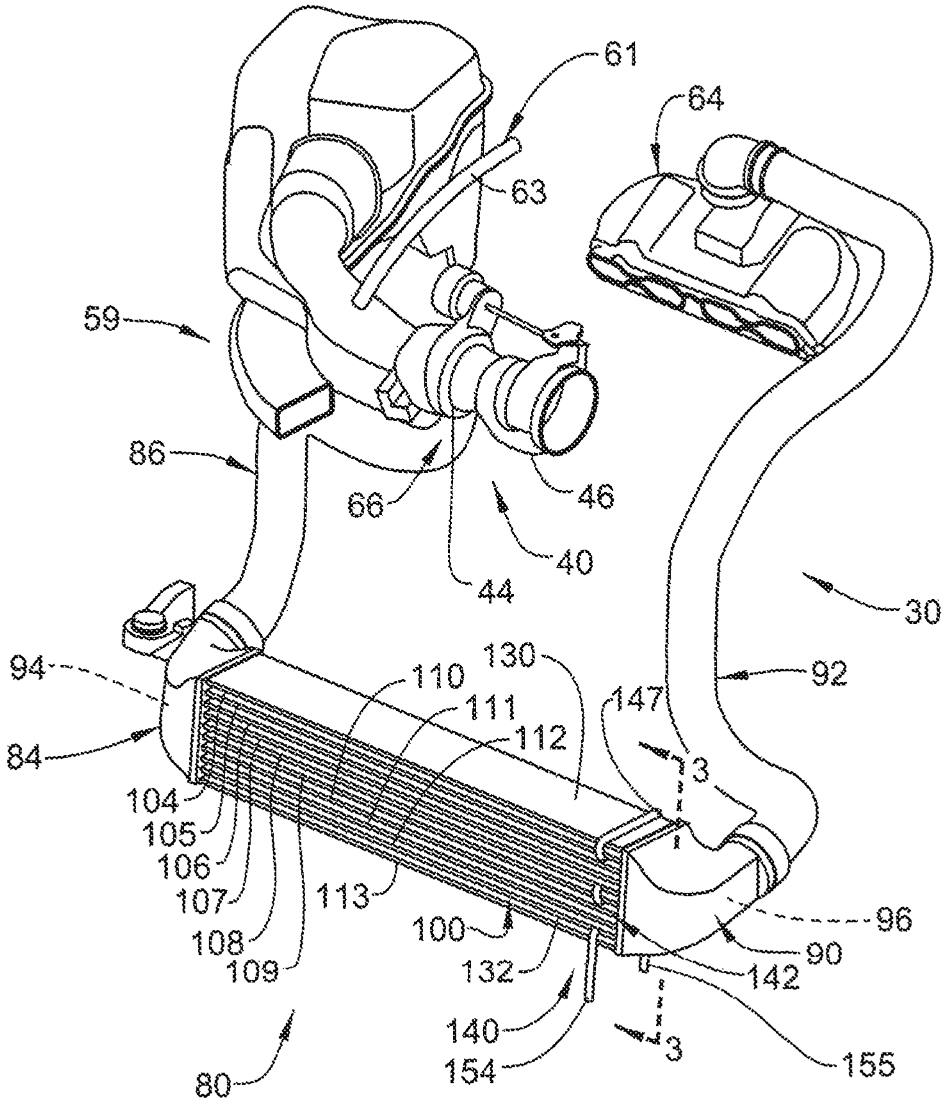
FIG. 2 depicts an intake system for the vehicle of FIG. 1 including an A-CAC, in accordance with an aspect of an exemplary embodiment.

In accordance with an aspect of an exemplary embodiment illustrated in FIG. 2, CAC 80 includes a first or inlet header 84 fluidically connected with a first charged air conduit 86 and a second or outlet header 90 fluidically connected to a second charged air conduit 92. First charged air conduit 86 defines an inlet to CAC 80 and is fluidically connected with charged gas outlet 66 of compressor portion 44. Second charged air conduit 92 defines an outlet and is fluidically connected with intake manifold 64. First header 84 includes a first interior portion 94 and second header 90 includes a second interior portion 96. A plurality of conduits 100 extend between first header 84 and second header 90 fluidically connecting first interior portion 94 and second interior portion 96.

Figure 3:
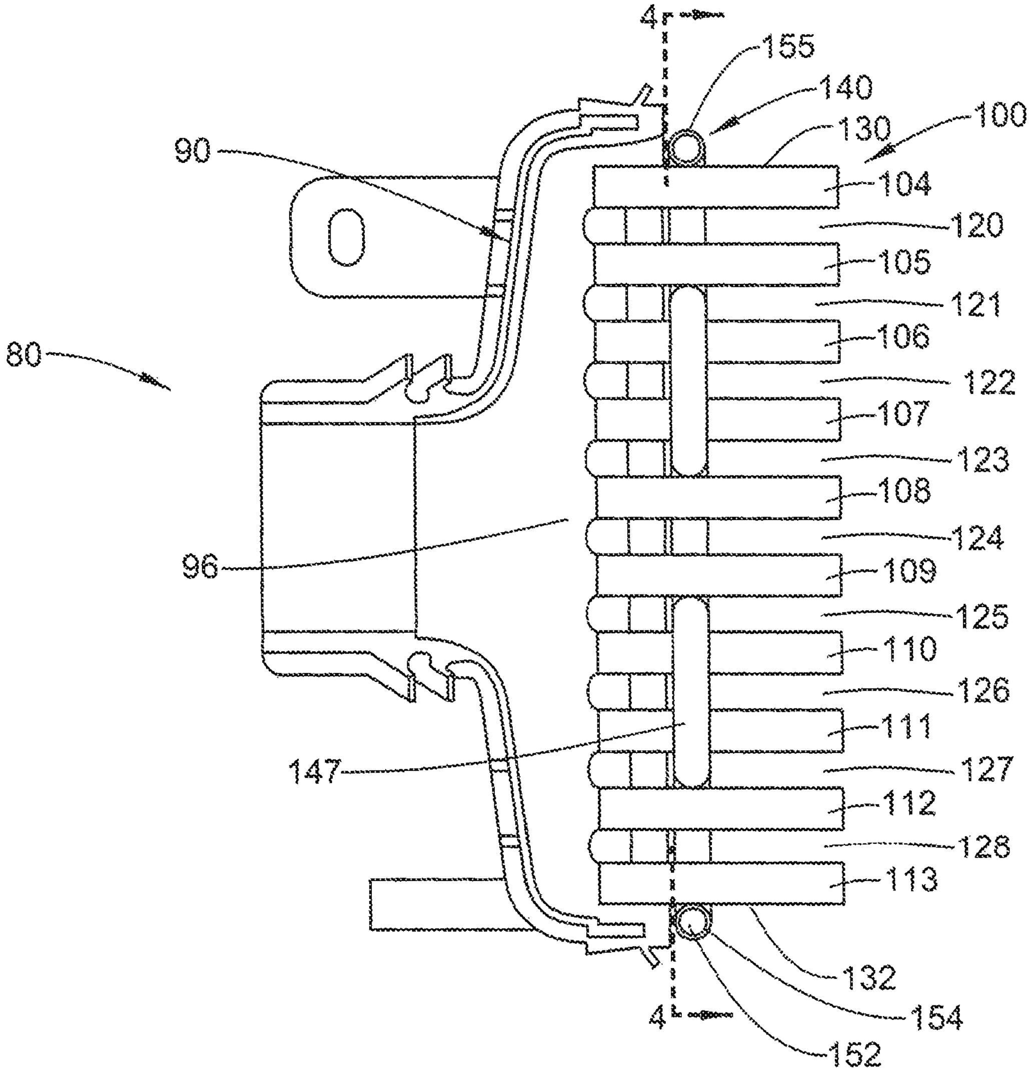
FIG. 3 depicts a partial cross-sectional side view of the A-CAC of FIG. 2 taken along the line 2-2.

In the exemplary embodiment shown, plurality of conduits 100 include a first conduit 104, a second conduit 105 a third conduit 106, a fourth conduit 107, a fifth conduit 108, a sixth conduit 109, a seventh conduit 110, an eighth conduit 111, a ninth conduit 112, and a tenth conduit 113. Referring to FIG. 3, a first gap 120 is provided between first and second conduits 104 and 105, a second gap 121 is provided between second conduit 105 and third conduit 106, a third gap 122 is provided between third conduit 106 and fourth conduit 107, a fourth gap 123 is provided between fourth conduit 107 and fifth conduit 108, a fifth gap 124 is provided between fifth conduit 108 and sixth conduit 109, a sixth gap 125 is provided between sixth conduit 109 and seventh conduit 110, a seventh gap 126 is provided between seventh conduit 110 and eighth conduit 111, an eighth gap 127 is provided between eighth conduit 111 and ninth conduit 112, and a ninth gap 128 is provided between ninth conduit 112 and tenth conduit 113. In the embodiment shown, first conduit 104 defines a first exterior conduit 130 and tenth conduit 113 defines a second exterior conduit 132.

Figure 4:
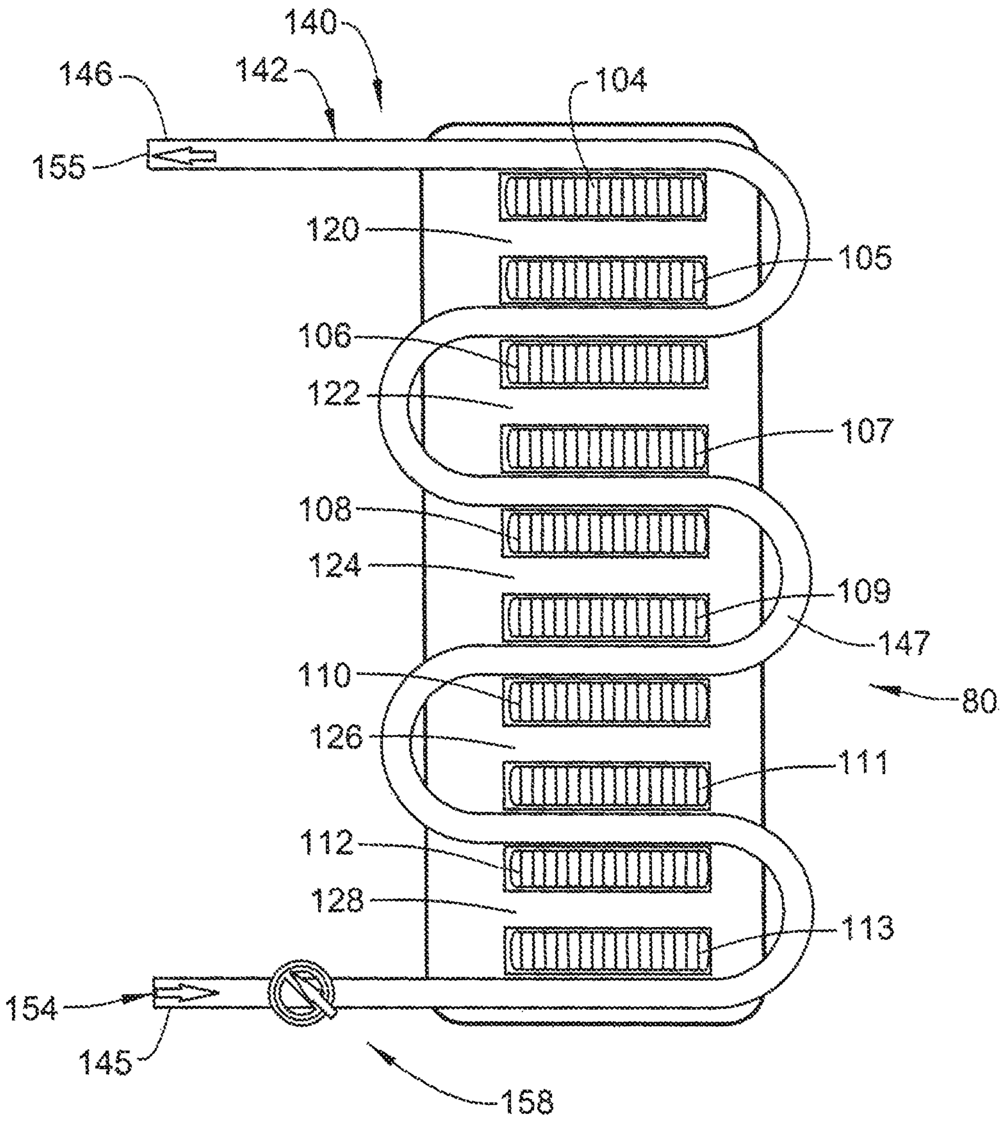
FIG. 4 depicts a partial cross-sectional top view of the A-CAC of FIG. 3 taken along the line 3-3.

In further accordance with an aspect of an exemplary embodiment illustrated in FIGS. 3 and 4, CAC 80 includes a heating system 140 having a heating element 142. Heating element 142 includes a first end portion 145, a second end portion 146 and an intermediate portion 147 extending therebetween. Intermediate portion 147 includes a number of bend portions (not separately labeled) and leg portions (also not separately labeled) that pass over exterior conduit 130 and through second, fourth, and sixth gaps 121, 123, 125 and over exterior conduit 132. Heating element 142 takes the form of a coolant conduit 152 including an inlet 154 and an outlet 155. A valve 158 is arranged at first end portion 145. Valve 158 may comprise a thermostatically controlled valve that selectively controllable to adjust a flow of engine coolant passing through heating element 142. The engine coolant flows in a heat exchange relationship with charged air passing from first header 84 to second header 90 through plurality of conduits 100. In this manner, a temperature of the charged air may be raised prior to passing into engine 26 via intake manifold 64.

Figure 5:
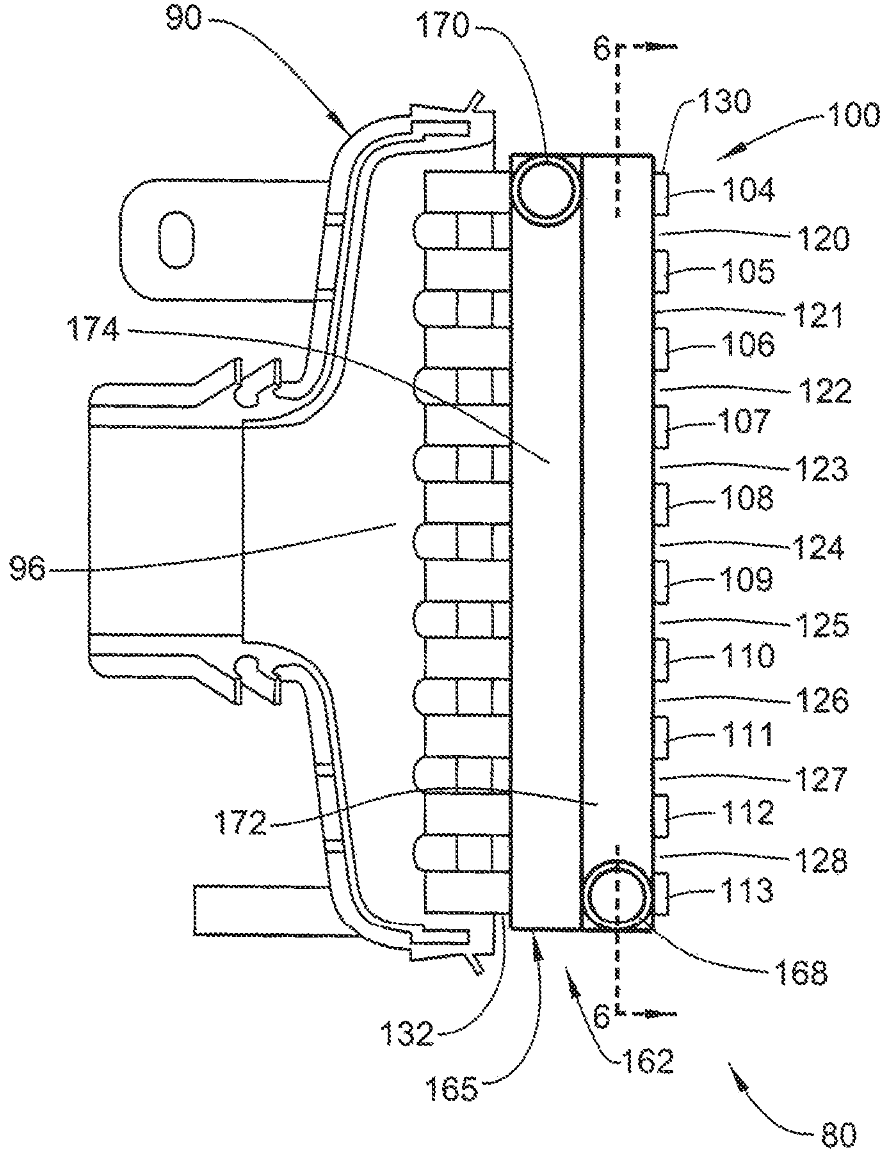
FIG. 5 depicts a partial cross-sectional side view of an A-CAC, in accordance with another aspect of an exemplary embodiment.
Figure 6:
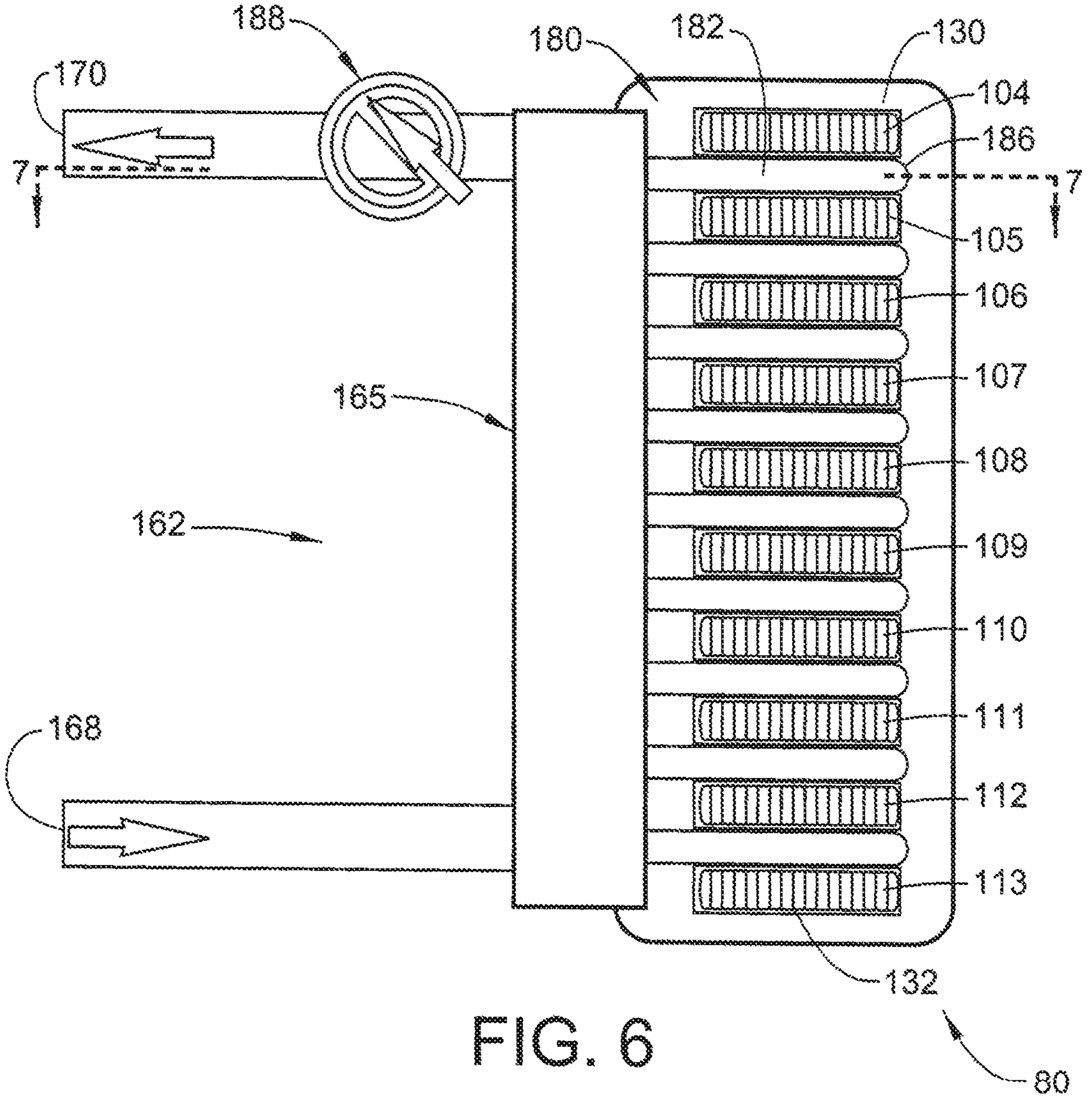
FIG. 6 depicts a partial cross-sectional end view of the A-CAC of FIG. 5 taken along the line 6-6.
Figure 7:
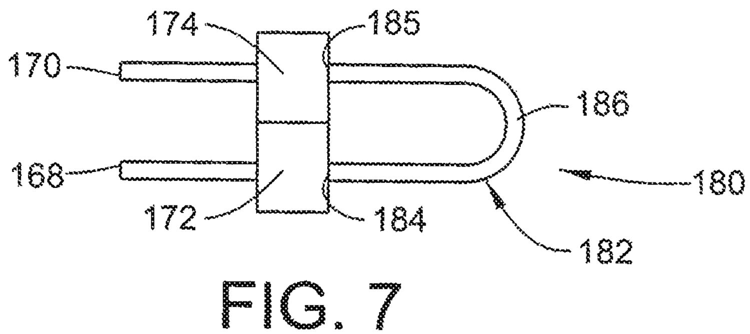
FIG. 7 depicts a partial cross-sectional top view of the A-CAC of FIG. 5 taken along the line 7-7.

Reference will now follow to FIGS. 5-7, wherein like reference numbers represent corresponding parts in the separate view, in describing a heating system 162 in the form of a coolant member 165 in accordance with another aspect of an exemplary embodiment. Coolant member 165 passes a flow of coolant in a heat exchange relationship with plurality of conduits 100. In accordance with an exemplary aspect, coolant member 165 includes an inlet 168 and an outlet 170. Inlet 168 is fluidically coupled to an inlet volume 172 and outlet 170 is fluidically coupled to an outlet volume 174. Coolant member 165 also includes a heating element 180 having a plurality of coolant pipes 182. Each of the plurality of coolant pipes 182 includes a first end portion 184 that fluidically connect inlet volume 172, a second end portion 185 fluidically connected with outlet volume 174 and an intermediate section 186 extending therebetween.

Intermediate section 186 is arranged in a heat exchange relationship with one or more of the plurality of conduits 100. A valve 188 is arranged upstream of outlet 170 to control coolant flow through coolant member 165. Engine coolant flows in a heat exchange relationship with charged air passing from first header 84 to second header 90 through plurality of conduits 100. In this manner, a temperature of the charged air may be raised to avoid passing the dew point prior to being guided into engine 26 via intake manifold 64.

Figure 8:
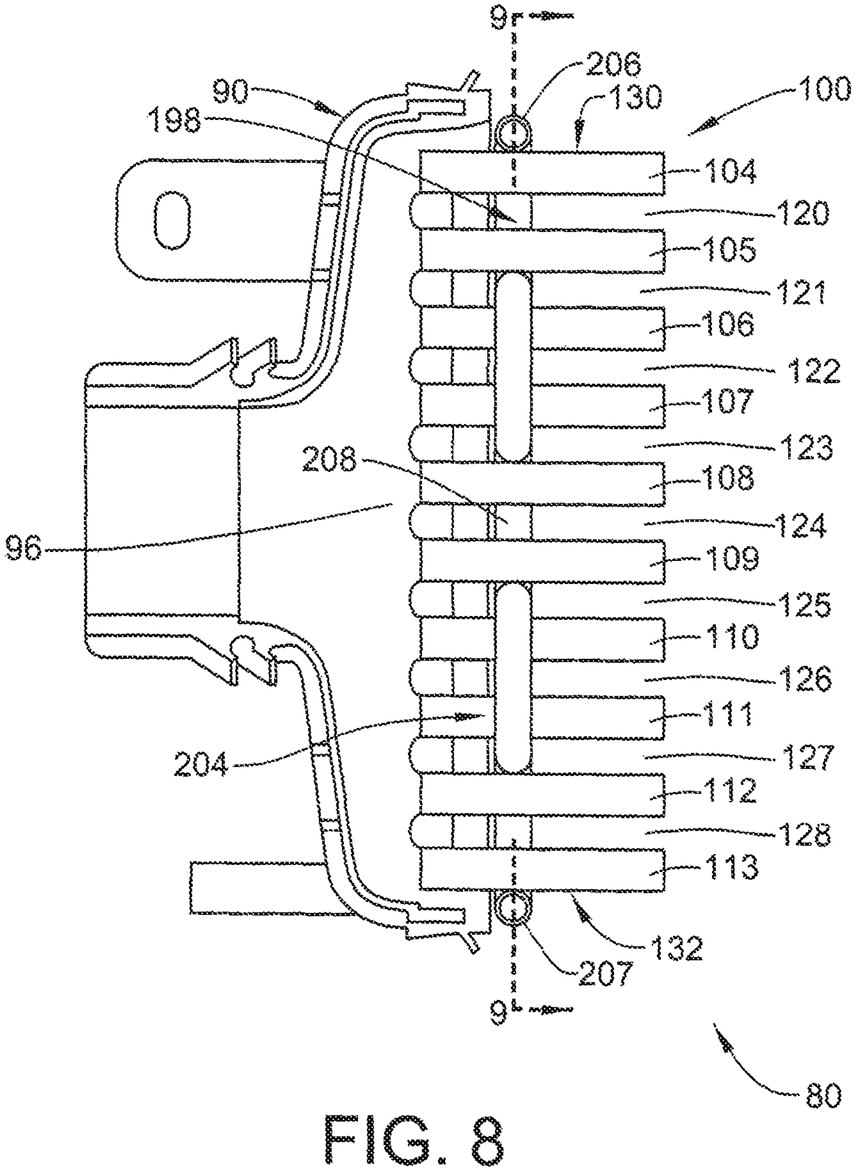
FIG. 8 depicts a partial cross-sectional side view of an A-CAC, in accordance with another aspect of an exemplary embodiment.
Figure 9:
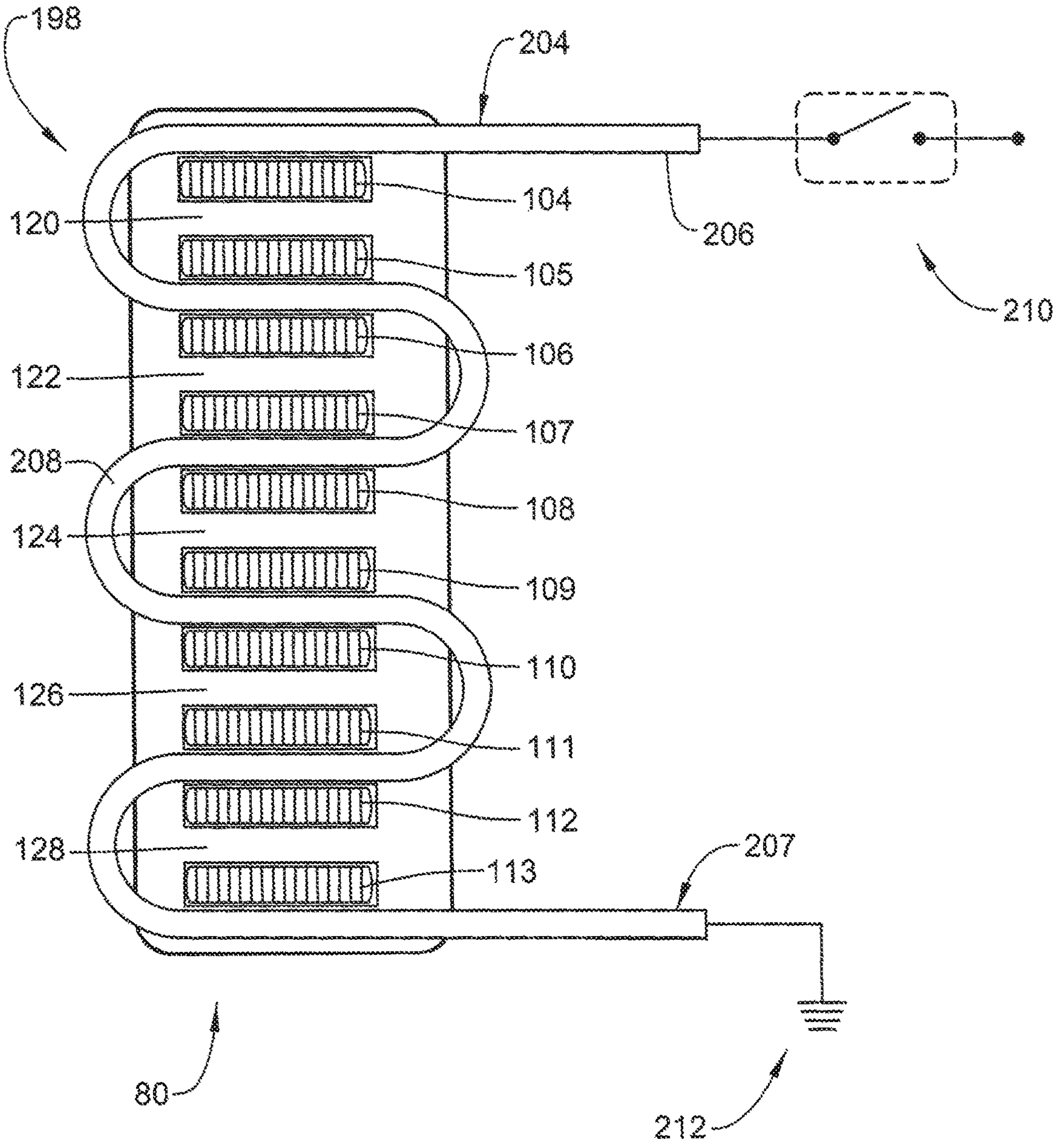
FIG. 9 depicts a partial cross-sectional top view of the A-CAC of FIG. 8 taken along the line 9-9.

Reference will now follow to FIGS. 8-9, wherein like reference numbers represent corresponding parts in the separate views, in describing a heating system 198 in accordance with yet another aspect of an exemplary embodiment. Heating system 198 includes a heating element 204 which may take the form of a positive temperature coefficient (PTC) heating element. Heating element 204 includes a first end portion 206, a second end portion 207 and an intermediate portion 208 extending therebetween. Intermediate portion 208 is arranged in a heat exchange relationship with one or more of the plurality of conduits 100. A thermostatically controlled switch 210 may be electrically connected to first end portion 206 and second end portion 207 is electrically connected to ground 212. It is to be understood that switch 210 may take on a variety of forms and is not limited to thermostatic control. Heating element 204 may be selectively activated to elevate a temperature of charged air passing through CAC 80 in order to avoid a charge air temperature reduction that falls below the dew point and thereby avoid and/or melt accumulating ice preventing blockages and enhance combustion characteristics in engine 26 by maintaining a selected airflow volume.

Figure 10:
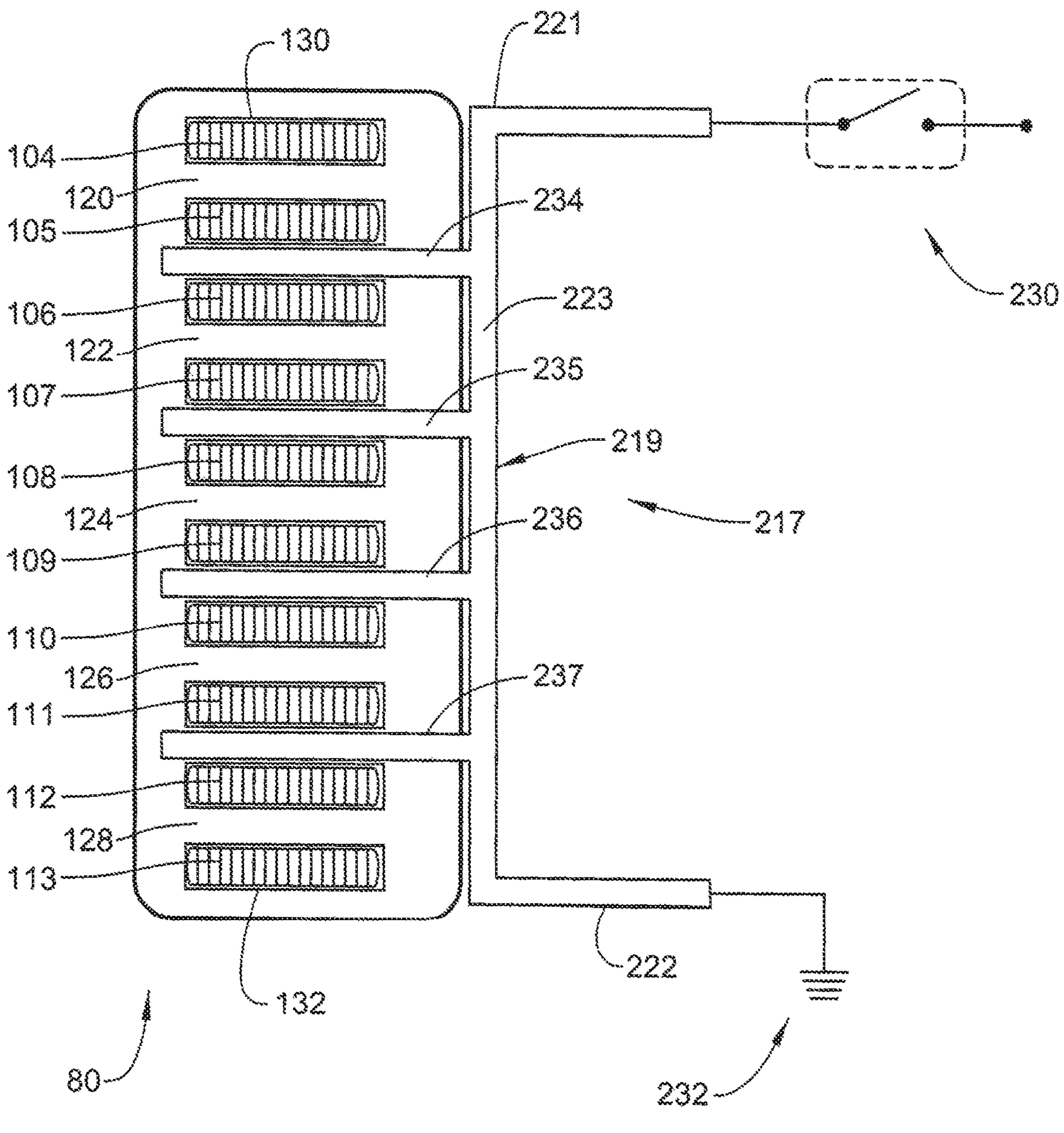
FIG. 10 depicts a partial cross-sectional end view of an A-CAC, in accordance with yet another aspect of an exemplary embodiment.

FIG. 10, wherein like reference numbers represent corresponding parts in the separate views, depicts a heating system 217 in accordance with still yet another aspect of an exemplary embodiment. Heating system 217 includes a heating element 219 that may take the form of a PTC heating element. Heating element 219 includes a first end portion 221, a second end portion 222 and an intermediate portion 223. A thermostatically controlled switch 230 may be electrically coupled to first end portion 221 and second end portion 222 may be electrically coupled to ground 232. It is to be understood that switch 230 may take on a variety of forms and is not limited to thermostatic control. A plurality of element branches 234-237 may extend outwardly of intermediate portion 223. Element branches 234-237 may extend into select ones of gaps 120-128 in a heat exchange relationship with one or more of the plurality of conduits 100. Heating element 219 may be selectively activated to elevate a temperature of charged air passing through CAC 80 in order to avoid a charge air temperature reduction that falls below the dew point and avoid and/or melt any accumulating ice thereby preventing blockages and enhance combustion characteristics in engine 26 by maintaining a selected airflow volume.

Figure 11:
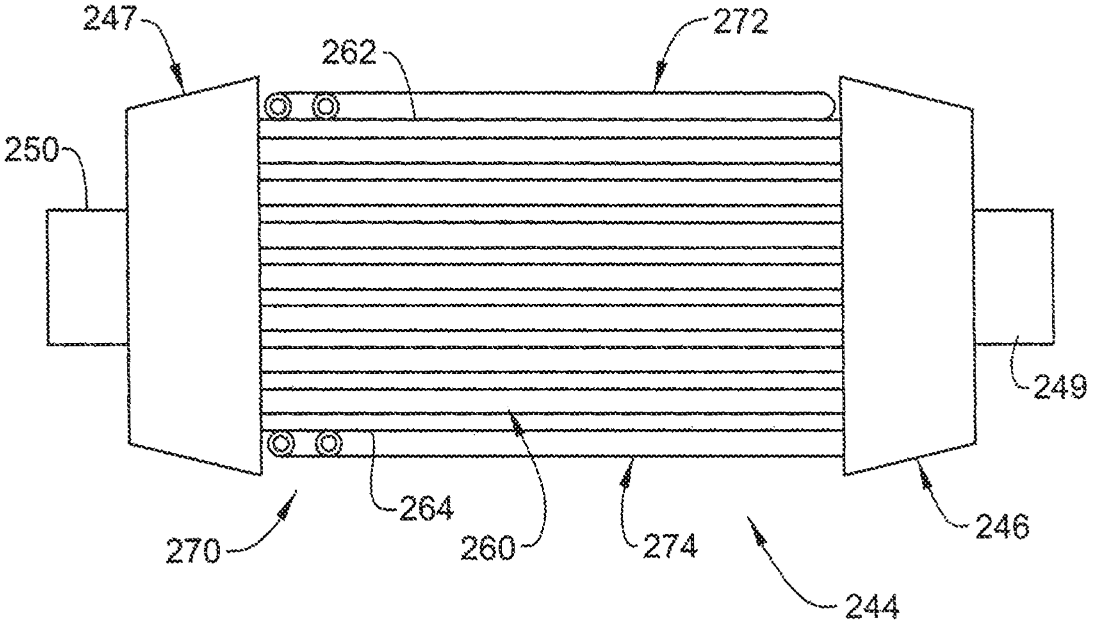
FIG. 11 depicts a side view of an A-CAC, in accordance with still yet another aspect of an exemplary embodiment.
Figure 12:
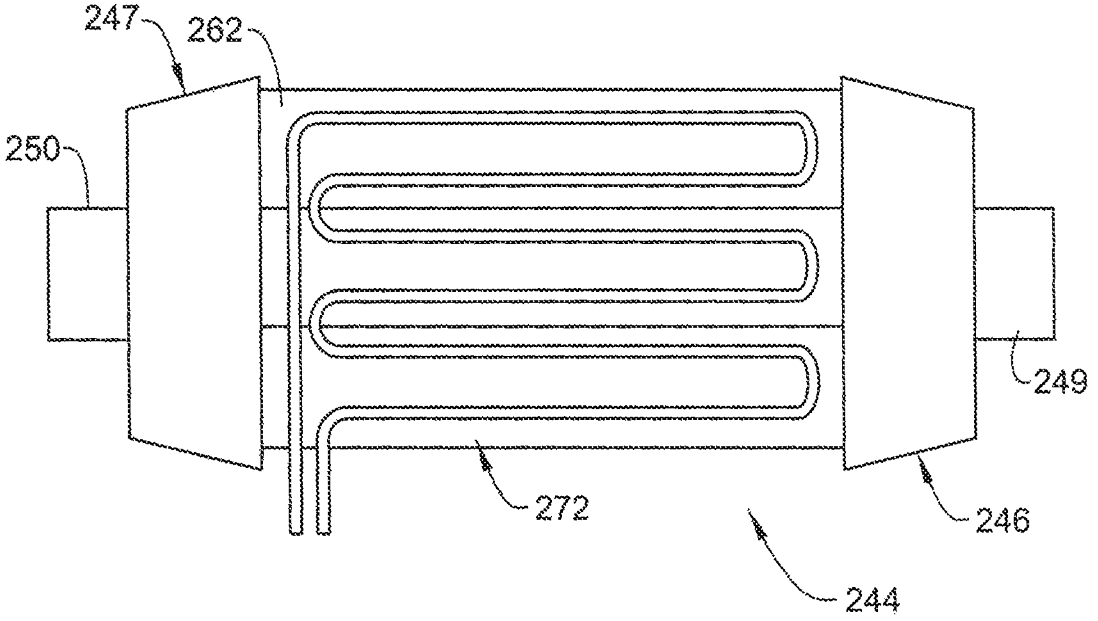
FIG. 12 depicts a top view of the A-CAC of FIG. 11.

Reference will now follow to FIGS. 11-12 in describing an air-to-air charged air cooler (CAC) 244 in accordance with another aspect of an exemplary embodiment. CAC 244 includes a first header 246 and a second header 247. First header 246 may define an inlet 249 while second header 247 may define an outlet 250. A plurality of conduits 260 extend between and fluidically connect first header 246 and second header 247. In this manner, charged air may enter inlet 249, flow into first header 246, pass through plurality of conduits 260 and enter second header 247. A first one of plurality of conduits 260 defines a first exterior conduit 262 and a second one of plurality of conduits 260 defines a second exterior conduit 264.

CAC 244 includes a heating system 270 that selectively elevates a temperature of the charged air passing through the plurality of conduits 260. Heating system 270 includes a first heating element 272 and a second heating element 274. First heating element 272 extends between first header 246 and second header 247 adjacent first exterior conduit 262 and second heating element 274 extends between first header 246 and second header 247 adjacent second exterior conduit 264. First and second heating elements 272 and 274 may take the form of conduits that deliver a fluid, such as engine coolant, in a heat exchange relationship with conduits 260. Alternatively, first and second heating elements 272 and 274 may be electrical-type heating elements, such as PTC heating elements. Heating elements 272 and 274 deliver a heat load to the plurality of conduits 260 in order to elevate a temperature of charged air passing from first header 246 to second header 247 prior to reaching intake manifold 64.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A charge air cooler (CAC) comprising:

a first header including a first interior portion;

a second header spaced from the first header, the second header including a second interior portion;

a plurality of conduits extending between the first header and the second header, the plurality of conduits defining an air-to-air heat exchanger including a first end fluidically connected to the first interior portion, a second end fluidically connected to the second interior portion, and an intermediate portion extending therebetween; and a heating system arranged in a heat exchange relationship with the plurality of conduits, the heating system including at least one heating element extending through a gap defined between adjacent ones of the plurality of conduits substantially perpendicularly relative to the intermediate portion, the heating system being selectively operable to increase a temperature of fluids passing through the plurality of conduits into one of the first and second headers.

2. The CAC according to claim 1, wherein the first header defines an inlet header for receiving a flow of gases from a turbocharger and the second header defines an outlet header for delivering the flow of gases to an internal combustion engine.

3. The CAC according to claim 2, wherein the heating system is arranged adjacent to the outlet header.

4. The CAC according to claim 3, wherein the gap includes a first gap defined between a first conduit of the plurality of conduits and a second conduit of the plurality of conduits spaced from the first conduit and a second gap defined between a third conduit of the plurality of conduits spaced from the second conduit of the plurality of conduits.

5. The CAC according to claim 4, wherein the at least one heating element includes a first end portion, a second end portion and an intermediate section extending into each of the first and second gaps.

6. The CAC according to claim 5, wherein the at least one heating element comprises a liquid coolant conduit.

7. The CAC according to claim 6, further comprising: a thermostatically controlled valve connected to the liquid coolant conduit.

8. The CAC according to claim 5, wherein the at least one heating element comprises a positive temperature coefficient (PTC) heating element.

9. The CAC according to claim 8, further comprising: a thermostatically controlled switch electrically connected to the PTC heating element.

10. The CAC according to claim 4, wherein the at least one heating element includes a first heating portion and at least two second heating portions connected to the first heating portion, one of the at least two second heating portions extending into the first gap and another of the at least two second heating portions extending into the second gap.

11. The CAC according to claim 3, wherein the heating system includes a coolant member including an inlet and an outlet arranged at the second header and at least one coolant pipe including a first end fluidically connected to the inlet portion, a second end fluidically connected to the outlet, and an intermediate portion arranged in a heat exchange relationship with the at least one conduit.

12. The CAC according to claim 3, wherein the heating system includes a heating element including a first end portion, a second end portion, and an intermediate section extending between the first and second headers in a heat exchange relationship with the plurality of conduits.

13. A vehicle comprising:

a body;

a powertrain mechanically linked to the body, the powertrain including an internal combustion engine having an intake manifold having an inlet and an exhaust manifold fluidically connected to an exhaust outlet;

a turbocharger including a turbine portion and a compressor portion, the turbine portion receiving a portion of exhaust gases passing from the exhaust manifold; and a charge air cooler (CAC) fluidically connected between the compressor portion and the intake manifold, the CAC comprising:

a first header including a first interior portion fluidically connected to the compressor portion;

a second header spaced from the first header, the second header including a second interior portion fluidically connected to the inlet;

a plurality of conduits extending between the first header and the second header, the plurality of conduits defining an air-to-air heat exchanger including a first end fluidically connected to the first interior portion, a second end fluidically connected to the second interior portion, and an intermediate portion extending therebetween; and a heating system arranged in a heat exchange relationship with the plurality of conduits, the heating system including at least one heating element extending through a gap defined between adjacent ones of the plurality of conduits substantially perpendicularly relative to the intermediate portion, the heating system being selectively operable to increase a temperature of fluids passing through the plurality of conduits into one of the first and second headers.

14. The CAC according to claim 13, wherein the first header defines an inlet header for receiving a flow of gases from a turbocharger and the second header defines an outlet header for delivering the flow of gases to an internal combustion engine.

15. The CAC according to claim 14, wherein the heating system is arranged adjacent to the outlet header.

16. The CAC according to claim 15, wherein the gap includes a first gap defined between a first conduit of the plurality of conduits and a second conduit of the plurality of conduits spaced from the first conduit and a second gap defined between a third conduit of the plurality of conduits spaced from the second conduit of the plurality of conduits.

17. The CAC according to claim 16, wherein the at least one heating element comprises a coolant conduit.

18. The CAC according to claim 16, wherein the at least one heating element comprises a positive temperature coefficient (PTC) heating element.

* * * * *